United States Patent

Morita et al.

[11] Patent Number: 5,972,836
[45] Date of Patent: Oct. 26, 1999

[54] THERMOSENSITIVE RECORDING MEDIUM

[75] Inventors: Mitsunobu Morita; Yasutomo Mori; Takeshi Kajikawa, all of Shizuoka, Japan

[73] Assignee: Ricoh Company, Ltd., Tokyo, Japan

[21] Appl. No.: 08/896,359

[22] Filed: Jul. 18, 1997

[30] Foreign Application Priority Data

Jul. 18, 1996 [JP] Japan .................................. 8-207841

[51] Int. Cl.$^6$ ....................................... B41M 5/40
[52] U.S. Cl. ......................... 503/207; 503/200; 503/226
[58] Field of Search .................................. 427/150–152; 503/200, 207, 226

[56] References Cited

U.S. PATENT DOCUMENTS 5,514,636   5/1996   Takeuchi ................................. 503/207

FOREIGN PATENT DOCUMENTS 0235296   8/1986   European Pat. Off. ............... 428/484
3828731   3/1989   Germany .............................. 503/207

*Primary Examiner*—Bruce H. Hess
*Attorney, Agent, or Firm*—Cooper & Dunham LLP

[57] ABSTRACT

A thermosensitive recording medium having a support, a thermosensitive layer provided on the support, and a protecting layer provided on the thermosensitive layer and containing montan wax particles having an average particle diameter AD of not greater than 1.5 $\mu$m and such a particle size distribution that at least 99% of the montan wax particles have a particle diameter of not greater than (AD+ 0.5 $\mu$m). The protecting layer is obtained by drying a layer of an aqueous dispersion containing an aqueous emulsion of the montan wax particles.

9 Claims, No Drawings

THERMOSENSITIVE RECORDING MEDIUM

BACKGROUND OF THE INVENTION

This invention relates to a thermosensitive recording medium having a support and a thermosensitive color-developing layer formed on the support and containing a leuco dye and a color developer capable of reacting with the leuco dye at an elevated temperature to develop a color.

Thermosensitive recording media capable of thermally recording an image through coloring reaction of a colorless or light-color leuco dye with a developer such as a phenol compound are now increasingly utilized in various fields such as recording papers for printers of computers, medical measuring instruments and facsimile machines, automatic ticket vending machines, thermosensitive copying machines and POS (point of sales) labels.

One problem of the known thermosensitive recording media is that the images and background are apt to be discolored when the thermosensitive layer thereof is brought into contact with a plastic film containing a plasticizer. To cope with this problem, a protecting layer is generally provided to cover the thermosensitive layer. The protecting layer is also desired to have lubricity or slippage in order to ensure smooth sliding between the recording medium and a thermal head, i.e. smooth feeding. When the thermosensitive recording medium is not smoothly fed, the recorded images are shrunk in the feeding direction. Thus, there is a proposal to incorporate a wax such as zinc stearate or montan wax into the protecting layer. While zinc stearate shows good lubricity, the resistance to plasticizers is not satisfactory. Montan wax, on the other hand, has good resistance to plasticizers but is not fully satisfactory with respect to lubricity.

SUMMARY OF THE INVENTION

It is, therefore, an object of the present invention to provide a thermosensitive recording medium having both excellent lubricity and excellent resistance to plasticizers.

Another object of the present invention is to provide a thermosensitive recording medium free of image shrinkage and printing noises and has high resistance to humidity.

In accomplishing the foregoing object, there is provided in accordance with the present invention a thermosensitive recording medium comprising a support, a thermosensitive layer provided on said support, and a protecting layer provided on said thermosensitive layer and containing montan wax particles having an average particle diameter AD of not greater than 1.5 $\mu$m and such a particle size distribution that at least 99% of said montan wax particles have a particle diameter of not greater than (AD+0.5 $\mu$m).

Other objects, features and advantages of the present invention will become apparent from the detailed description of the preferred embodiments of the invention to follow.

DETAILED DESCRIPTION OF THE PREFERRED EMBODIMENTS OF THE INVENTION

The thermosensitive recording medium of the present invention has a support on which a thermosensitive color-developing layer containing a leuco dye and a color developer is supported. Any conventionally used support, such as paper, a plastic film or a synthetic paper, may be suitably used for the purpose of the present invention. The thermosensitive layer is overlaid with a protecting layer.

The protecting layer contains a binder resin and montan wax particles. For reasons of lubricity of the protecting layer and matching property of the protecting layer relative to a thermal head, it is important that the montan wax particles have an average particle diameter AD of not greater than 1.5 $\mu$m, preferably not greater than 1.0 $\mu$m, more preferably 0.1–0.6 $\mu$m, and such a particle size distribution that at least 99% of the montan wax particles have a particle diameter of not greater than (AD+0.5 $\mu$m). The amount of the montan wax particles is generally 0.05–1.5 parts by weight per part by weight of the binder resin. It is also preferred that the montan wax particles be substantially spherical in shape.

In order to obtain the protecting layer containing montan wax having the above specific particle distribution, it is important that emulsified montan wax should be used. A conventional dispersion method in which the wax is mechanically milled using glass beads in an aqueous medium containing a suitable dispersing agent cannot produce emulsified montan wax suitable for the purpose of the present invention. Emulsified montan wax may be produced by dispersing montan wax in an aqueous medium using a suitable emulsifier at a temperature sufficient to melt the wax. The emulsion containing the melted wax particles is then cooled to solidify the wax particles while continuing the dispersing operation.

Examples of emulsifiers used for formation of emulsified montan wax include nonionic surfactants such as polyvinyl alcohol, modified polyvinyl alcohol, polyoxyethylene alkyl ether, polyoxyethylene alkylphenyl ether, an oxyethylene-oxypropylene block copolymer, a polyoxyethylenesorbitan fatty acid ester and a polyethylene glycol fatty acid ester; and anionic surfactants such as fatty acid salts, alkyl sulfate salts, alkylbenzenesulfonic acid salts, alkylnaphthalene-sulfonic acid salts, alkylsulfosuccinic acid salts, alkyl diphenyl ether disulfonic acid salts, alkylphosphoric acid salts, polyoxyethylene alkylsulfate salts, naphthalenesulfonic acid formaldehyde condensates and polyoxyethylene alkylphosphoric acid esters. Reactive emulsifiers such as those having ethylenic unsaturated bonds may also be used. Above all, the use of polyvinyl alcohol, especially modified polyvinyl alcohol, is preferred for reasons of stability of a coating liquid for the formation of the protecting layer and prevention of background coloring of the protecting layer.

The binder resin is preferably a water-soluble organic polymeric material such as polyvinyl alcohol, modified polyvinyl alcohol (e.g. carboxyl group-modified polyvinyl alcohol or amino group-modified polyvinyl alcohol), a cellulose derivative (e.g. methoxy-cellulose, hydroxyethylcellulose, carboxymethylcellulose, hydroxymethylcellulose, ethylcellulose or methylcellulose), gelatin, casein, polyvinyl pyrrolidone, a styrene-maleic anhydride copolymer, a diisobutylene-maleic anhydride copolymer, polyacrylamide, modified polyacrylamide, a methyl vinyl ether-maleic anhydride copolymer, carboxyl-modified polyethylene, a polyvinyl alcohol-acrylamide block copolymer, melamine-formaldehyde resin or a urea-formaldehyde resin.

If desired, a resin in the form of an aqueous emulsion, a hydrophobic resin, a UV-hardenable resin or electron beam-hardenable resin may also be used as the binder resin. Illustrative of suitable hydrophobic resins and resins for forming the aqueous emulsion are polyvinyl acetate, polyurethane, a styrene-butadiene copolymer, a styrene-butadiene-acrylate terpolymer, polyacrylic acid, polyacrylic acid ester, a vinyl chloride-vinyl acetate copolymer, polybutylmethacrylate, polyvinylbutyral, polyvinyl acetal, ethyl cellulose and an ethylene-vinyl acetate copolymer.

It is preferred that the protecting layer contain a silicone compound for reasons of improved lubricity. Examples of silicone compounds include silicone oil and silicone rubbers. Silicone rubbers capable of being cured at room temperature are especially preferably used. The silicone compound is generally used in an amount of 0.01–1 part by weight per part by weight of the binder resin.

It is also preferred that the protecting layer contain an organic pigment (organic filler) such as a urea-formaldehyde resin, a polystyrene resin, a styrene-methacrylic acid copolymer resin or a polyvinylidene chloride resin. The organic pigment is in the form of fine powder, preferably spherical fine powder and preferably has an average particle diameter of 2–10 μm. The amount of the organic pigment is generally 0.05–2 parts by weight per part by weight of the binder resin. If desired, the organic pigment may be used in conjunction with an inorganic filler such as silica, zinc oxide, aluminum hydroxide, zinc hydroxide, barium sulfate, kaolin, clay, talc, calcium carbonate, magnesium carbonate, calcined clay, titanium oxide, diatomaceous earth, anhydrous silica, activated clay, surface treated calcium or surface treated silica.

If desired, montan wax may be used in conjunction with other wax such as a plant wax (e.g. candelila wax, carnauba wax, rice wax or Japan tallow), an animal wax (e.g. bees wax, lanolin or spermaceti wax), a mineral wax (e.g. ceresin), a petroleum wax (e.g. paraffin, vaseline, microcrystalline wax or petrolatum), synthetic hydrocarbon wax (e.g. Fischer-Tropsch wax), a fatty acid (e.g. a wax (e.g. a stearate wax, polyethylene wax, microcrystalline wax or carboxyl-modified paraffin wax), an amide, bisamide, ester, ketone or metal salt of an acid (e.g. adipic acid, isophthalic acid, stearic acid, oleic acid, erucic acid, lauric acid, sebacic acid, behenic acid or palmitic acid) or an amide-modified or alkyl-modified silicone resin.

The protecting layer may further contain a water-proof agent such as formalin, chrome alum, glyoxal, melamine, a melamine-formalin resin, a polyamide resin or a polyamide-epichlrohydrin resin. Various additives such as a surfactant and an agent for preventing the color development by pressure may be incorporated into the protecting layer, if desired.

The thermosensitive layer contains a leuco dye and a developer. Any leuco dye customarily employed in the field of thermosensitive recording material may be suitably used for the purpose of the present invention. For example, triphenylmethane leuco compounds, triarylmethane leuco compounds, fluoran leuco compounds, phenothiazine leuco compounds, thiofluorane leuco compounds, xanthene leuco compounds, indolylphthalide leuco compounds, spiropyran leuco compounds, azaphthalide leuco compounds, chromenqpyrazol leuco compounds, methyne leuco compounds, rhodamine anilinolactam leuco compounds, rhodamine lactam leuco compounds, quinazoline leuco compounds, diazaxanthene leuco compounds and bislactone leuco compounds.

Illustrative of suitable leuco compounds are 3,3-bis(p-dimethylaminophenyl)phthalide, 3,3-bis(p-dimethylaminophenyl)-6-dimethylaminophthalide (or Crystal Violet Lactone), 3,3-bis(p-dimethylaminophenyl)-6-diethylaminophthalide, 3,3-bis(p-dimethylaminophenyl)-6-chlorophthalide, 3,3-bis(p-dibutylaminophenyl)phthalide, 3-cyclohexylamino-6-chlorofluoran, dimethylamino-5,7-dimethylfluoran, 3-diethylamino-7-chlorofluoran, 3-diethylamino-7-methylfluoran, 3-diethylamino-7,8-benzfluoran, 3-diethylamino-6-methyl-7-chlorofluoran, 3-dibutylamino-6-methyl-7-anilinofluoran, 3-dipentylamino-6-methyl-7- anilinofluoran, 3-(N-p-tolyl-N-ethylamino)-6-methyl-7-anilinofluoran, 3-pyrrolidono-6-methyl-7-anilinofluoran, 2-N-m-trifluoromethylphenylamino-6-diethylaminofluoran, 2-[3,6-bis(diethylamino)-9-(o-chloroanilino)-xanthylbenzoic acid lactam], 3-diethylamino-6-methyl-7-(m-trichloromethylanilino)fluoran, 3-diethylamino-7-(o-chloroanilino)fluoran, 3-dibutylamino-7-(o-chloroanilino)-fluoran,3-N-methyl-N-amylamino-6-methyl-7-anilinofluoran, 3-N-methyl-N-cyclohexylamino-6-methyl-7-anilinofluoran, 3-N-methyl-N-isoamylamino-6-methyl-7-anilinofluoran, 3-N-methyl-N-isobutylamino-6-methyl-7-anilinofluoran, 3-diethylamino-6-chloro-7-anilinofluoran, 3-(N-ethyl-N-2-ethoxypropylamino)-6-methyl-7-anilinofluoran, 3-N-ethyl-N-tetrafurfurylamino-6-methyl-7-anilinofluoran, 3-diethylamino-6-methyl-7-anilinofluoran, 3-diethylamino-5-methyl-7-dibenzylaminofluoran, benzoleuco methylene blue, 6-chloro-8-methoxy-2,3-dihydrobenzoindole-2-spiro-2'-(2',3'-dihydrobenzofuran), 6-bromo-8-methoxy-2,3-dihydrobenzoindole-2-spiro-2'-(2', 3'-dihydrobenzofuran), 3-(2'-hydroxy-4'-dimethylaminophenyl)-3-(2'-methoxy-5'-chlorophenyl) phthalide, 3-(2'-hydroxy-4'-dimethylaminophenyl)-3-(2'-methoxy-5'-nitrophenyl)phthalide, 3-(2'-hydroxy-4'-diethylaminophenyl)-3-(2'-methoxy-5'-methylphenyl) phthalide, 3-diethylamino-6-methyl-7-(2',4'-dimethylanilino)fluoran,3-(2'-methoxy-4'-dimethylaminophenyl)-3-(2'-hydroxy-4'-chloro-5'-methylphenyl)phthalide, 3-morpholino-7-(N-propyl-N-o-trifluoromethylphenylamino)fluoran, 3-morpholino-7-(N-propyl-N-m-trifluoromethylphenylamino)fluoran, 3-morpholino-7-(N-propyl-N-p-trifluoromethylphenylamino)fluoran, 3-pyrrolidino-7-o-trifluoromethylanilinofluoran, 3-pyrrolidino-7-m-trifluoromethylanilinofluoran, 3-pyrrolidino-7-p-trifluoromethylanilinofluoran, 3-diethylamino-5-chloro-7-(N-benzyl-N-trifluoromethylphenylami no)fluoran, 3-pyrrolidino-7-(di-p-chlorophenyl) -methylaminofluoran, 3-diethylamino-5-chloro-7-(α-phenylethylamino)fluoran, 3-N-ethyl-N-p-methylphenylamino-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-N-methyl-N-o-methylphenylamino-7-(p-n-butylanilino)fluoran, 2-chloro-3-N-methyl-N-m-methylphenylamino-7-(p-n-butylanilino) fluoran, 2 -chloro-3-N-methyl-N-p-methylphenylamino-7-(p-n-butylanilino)-fluoran, 3-N-benzyl-N-cyclohexylamino-5,6-benzo-7-α-naphthylamino-4'-bromofluoran, 3-diethylamino-6-methyl-7-mesidino-4',5'-benzofluoran, 3-(p-dimethylaminophenyl)-3-[2,2-bis(p-dimethylaminophenyl)etheny 1]phthalide, 3-(p-dimethylaminophenyl)-3-[2,2-bis(p-dimethylaminophenyl)-ethenyl]-6-dimethylaminophthalide, 3-(p-dimethylaminophenyl)-3-(2-p-dimethylaminophenyl-2-phenyle theyl)phthalide, 3-(p-dimethylaminophenyl)-3-(2-p-dimethylaminophenyl-2-p-chlorophenylethenyl)-6-dimethylaminophthalide, 3-(4'-dimethylamino-2'-methoxyphenyl)-3-(4"-p-dimethylaminophenyl-4"-p-chlorophenyl-1",3"-butadienyl)-5,6-benzophthalide, 3-(4'-dimethylamino-2'-benzyloxyphenyl)-3-(4"-p-dimethylaminophenyl-4"-phenyl-1",3"-butadienyl)-5,6-benzophthalide, 3-dimethylamino-6-dimethylaminofluorene-9-spiro-3'-(6'-dimethylamino) phthalide, 3,3-bis[2-(p-dimethylaminophenyl)-2-(p-methoxyphenyl)ethenyl]-4,5,6,7-tetrachlorophthalide, 3-bis [2,2-bis(4-pyrrolidinophenyl)-ethenyl]-5,6-dichloro-4,7-dibromophthalide, bis(p-dimethyl-aminostyryl)-1-naphthalenesulfonylmethane and bis(p-dimethylaminostyryl)-1-p-tolylsulfonylmethane. These leuco dyes may be used singly or in combination of two or more thereof.

The leuco dye is generally used in an amount of 10–50% by weight, preferably 20–40% by weight based on the weight of the thermosensitive color-developing layer for reasons of color density and storage stability.

Any developer customarily used in the field of thermosensitive recording material may be suitably used for the purpose of the present invention. Illustrative of suitable developers are 4,4'-isopropylidenediphenol, 4,4'-isopropylidenebis(o-methylphenol), 4,4'-s-butylidenediphenol, 4,4'-isopropylidenebis(2-t-butylphenol), zinc p-nitrobenzoate, 1,3,5-tris(4-t-butyl-3-hydroxy-2,6-dimethylbenzyl)isocyanuric acid, 2,2-(3',4'-dihydroxyphenyl)propane, bis(4-hydroxy-3-methylphenyl) sulfide, 4-β-(p-methoxyphenoxy)-ethoxy]salicylic acid, 1,7-bis(4-hydroxyphenylthio)-3,5-dioxaheptane, 1,5-bis(4-hydroxyphenylthio)-5-oxapentane, monocalcium monobenzylphthalate, 4,4'-cyclohexylidenediphenol, 4,4'-isopropylidenebis(2-chlorophenol), 2,2'-methylenebis(4-methyl-6-tert-butylphenol), 2,2'-methylenebis(4-ethyl-6-tert-butylphenol), 4,4'butylidenebis(6-tert-butyl-2-methylphenol), 1,1,3-tris(2-methyl-4-hydroxy-5-tert-butylphenyl)butane, 1,1,3-tris(2-methyl-4-hydroxy-5-cyclohexylphenyl)butane, 4,4'-thiobis(6-tert-butyl-2-methylphenol), 4,4'-diphenolsulfone, 4-isopropoxy-4'-hydroxydiphenylsulfone, 4-benzyloxy-4'-hydroxydiphenylsulfone, 4,4'-diphenolsulfoxide, isopropyl p-hydroxybenzoate, benzyl p-hydroxybenzoate, benzyl protocatechuate, stearyl gallate, lauryl gallate, octyl gallate, 1,3-bis(4-hydroxyphenylthio)propane, N,N'-diphenylthiourea, N,N'-di(m-chlorophenyl)thiourea, salicylanilide, methyl bis(4-hydroxyphenyl)acetate, benzyl bis(4-hydroxyphenyl)acetate, 2,4'-diphenolsulfone, 2,2'-diallyl-4,4'-diphenolsulfone, 3,4-dihydroxyphenyl-4'-methyldiphenylsulfone, zinc 1-acetyloxy-2-nathoate, zinc 2-acetyloxy-1-naphthoate, zinc 2-acetyloxy-3-naphthoate, α, α-bis(4-hydroxyphenyl)-α-methyltoluene, antipyrine complex of zinc thiocyanate, tetrabromobisphenol A, tetrabromobisphenol S, 4,4'-thiobis(2-methylphenol) and 4,4'-thiobis(2-chlorophenol). The above color developers may be used singly or in combination of two or more thereof.

The color developer is generally used in an amount of 1–20 times, preferably 2–10 times, the weight of the leuco dye for reasons of color density and storage stability.

The thermosensitive layer may contain a binder to firmly bond the layer to the support. Any binder conventionally used in the field of the thermosensitive recording medium may be employed for the purpose of the present invention. Illustrative of suitable binders are water-soluble polymers such as polyvinyl alcohol, carboxyl group-modified polyvinyl alcohol, starch, starch derivatives, hydroxyethylcellulose, hydroxymethylcellulose, ethylcellulose, methylcellulose, carboxymethylcellulose, sodium polyacrylate, polyvinyl pyrrolidone, an acrylamide-acrylate copolymer, an acrylamide-acrylate-methacrylic acid terpolymer, a salt of a styrene-maleic anhydride copolymer, a salt of a styrene-acrylic acid copolymer, a salt of isobutylene-maleic anhydride copolymer, polyacrylamide, sodium alginate, gelatin and casein; aqueous emulsions such as polyvinyl acetate, a vinyl acetate-acrylic acid copolymer, a styrene-acrylate copolymer, polyurethane, polyacrylate, polymethacrylate, a vinylchloride-vinyl acetate copolymer, an ethylene-vinyl acetate copolymer; and latex such as a styrene-butadiene copolymer and a styrene-butadiene-acrylic acid (or acrylate) copolymer.

Various additives may be further incorporated into the thermosensitive layer. The additives include an inorganic or organic filler such as silica, zinc oxide, aluminum hydroxide, zinc hydroxide, barium sulfate, kaolin, clay, talc, calcium carbonate, magnesium carbonate, calcined clay, titanium oxide, diatomaceous earth, anhydrous silica, activated clay, surface treated calcium, styrene-methacrylic acid copolymer powder, nylon powder, polyethylene powder, polystyrene powder or urea-formaldehyde resin powder; a fusible substance (or lubricant) having a melting point of 50–200° C., such as a fatty acid (e.g. stearic acid or behenic acid), a fatty acid ester, a fatty amide (e.g. stearamide or palmitamide), a fatty acid salt (e.g. zinc stearate, calcium stearate, aluminum stearate, zinc plamitate or zinc behenate), a wax (e.g. a stearate wax, polyethylene wax, carnauba wax, microcrystalline wax or carboxyl-modified paraffin wax), an aromatic carboxylic acid-amine condensation product, p-benzylbiphenyl, terphenyl, triphenylmethane, benzyl p-benzyloxybenzoate, β-benzyloxynaphthalene, phenyl β-naphthoate, phenyl 1-hydroxy-2-naphthoate, methyl 1-hydroxy-2-naphthoate, diphenyl carbonate, glycol carbonate, dibenzyl terephthalate, dimethyl terephthalate, 1,4-dimethoxynaphthalene, 1,4-diethoxynaphthalene, 1,4-dibenzyloxynaphthalene, 1,2-diphenoxyethane, 1,2-bis(3-methylphenoxy)ethane, 1,2-bis(4-methylphenoxy)ethane, 1,4-diphenoxy-2-butene, 1,2-bis(4-methoxyphenylthio) ethane, dibenzoylmethane, 1,4-diphenylthiobutane, 1,4-diphenylthio-2-butene, 1,3-bis(2-vinyloxyethoxy)benzene, 1-4-bis(2-vinyloxyethoxy)benzene, p-(2-vinyloxyethoxy) biphenyl, p-allyloxybiphenyl, p-propagyloxybiphenyl, dibenzoyloxymethane, dibenzoyloxypropane, dibenzyldisulfide, 1,1-diphenylethanol, 1,1-diphenylpropanol, p-benzyloxybenzyl alcohol, 1,3-phenoxy-2-propanol, N-octadecylcarbamoyl-p-methoxycarbonylbenzene, N-octadecylcarbamoylbenzene, 1,2-bis(4-methoxyphenoxy)propane, 1,5-bis(4-methoxyphenoxy(-3-oxapentane, dibenzyl oxalate, di-p-methylbenzyl oxalate or di-4-chlorobenzyl oxalate.

Preferably, an intermediate layer is provided between the support and the thermosensitive layer. The intermediate layer preferably contains in the form of empty beads having an outside diameter $D_o$ of 0.1–10 μm, preferably 1–5 μm, and an inside diameter $D_i$ which is at least 30%, preferably 50–95%, of the outside diameter ($D_i \geq 0.3D_o$, preferably $0.95D_o \geq D_i \geq 0.5D_o$). The thickness of the heat insulating layer is generally 1–10 μm, preferably 3–5 μm. The empty beads filler is generally used in an amount of at least 30%, preferably 50–80%, of the volume of the heat insulating layer. Both organic and inorganic empty beads may be used for the purpose of the present invention. Illustrative of suitable inorganic beads are glass empty beads and ceramic empty beads. Illustrative of suitable organic beads are empty beads formed of a polymer such as an acrylic polymer or a polyvinylidene chloride polymer. A binder such as an emulsion resin or a water-soluble resin may be used for supporting the beads in the intermediate layer and for bonding the layer to the adjacent layer and the support. The intermediate layer may be formed in the same manner as that for the thermosensitive color-developing layer.

The thermosensitive layer may be formed on the support by applying a coating of a composition containing the above ingredients. For example, the above ingredients are homogeneously dispersed in a suitable dispersing medium or dissolved in a suitable solvent and the resulting dispersion or solution is coated by a wire bar or any other suitably coating means to a predetermined thickness over the support, followed by drying of the coat. The dispersion medium or solvent may be an organic solvent. The color-developing layer generally has a thickness of 1–50 μm, preferably 3–20 μm. The thermosensitive layer is overlaid with the above-described protecting layer. The protecting layer may be formed by any suitably known manner, such as by applying a coating liquid, in the form of a dispersion, containing the above-described ingredients over a surface of the thermosensitive layer.

The thermosensitive recording medium thus constructed may be heated imagewise with a thermal head, a heated pen, a laser beam or the like heating means to give a color-developed image.

The following examples will further illustrate the present invention. Parts and percentages are by weight.

EXAMPLES 1–16

Preparation of Coating Liquid for Undercoat Layer

The following components were homogeneously mixed to obtain a coating liquid for an undercoat layer in the form of dispersion.

| | |
|---|---|
| hollow filler of styrene-acrylate copolymer (solid content: 27.5%, $D_i/D_o$: 0.5) | 36 parts |
| styrene-butadiene copolymer latex (solid content: 47.5%) | 10 parts |
| water | 54 parts |

Preparation of Coating Liquid for Thermosensitive Layer

[Liquid A]

The following components were ground with a ceramic ball mill for two days to obtain Dispersion A.

| | |
|---|---|
| 3-dibutylamino-6-methyl-7-anilinoflouran | 20 parts |
| 10% aqueous polyvinyl alcohol solution | 20 parts |
| Water | 60 parts |

[Liquid B]

The following components were ground with a ceramic ball mill for two days to obtain Liquid B.

| | |
|---|---|
| 4-isopropoxy-4'-hydroxydiphenylsulfone | 20 parts |
| 10% aqueous polyvinyl alcohol solution | 25 parts |
| water | 50 parts |

[Liquid C]

The following components were ground with a ceramic ball mill for two days to obtain Liquid C.

| | |
|---|---|
| Silica | 20 parts |
| 5% aqueous methylcellulose solution | 20 parts |
| water | 50 parts |

Using thus obtained Liquids A–C, coating liquid for thermosensitive layer having the following formulation was prepared by mixing with stirring:

| | |
|---|---|
| Liquid A | 15 parts |
| Liquid B | 45 parts |
| Liquid C | 45 parts |
| 20% alkali aqueous solution of isobutylene-maleic anhydride copolymer | 5 parts |

Preparation of Coating Liquid for Protecting Layer

The following components were ground with a ceramic ball mill for two days to obtain Liquid D.

[Liquid D]

| | |
|---|---|
| aluminum hydroxide | 20 parts |
| 10% aqueous polyvinyl alcohol solution | 20 parts |
| water | 60 parts |

The following components were mixed in a ceramic ball mill for 3 hours to obtain Liquid E.

[Liquid E]

| | |
|---|---|
| pigment (as shown in Table 1) | 20 parts |
| 10% aqueous polyvinyl alcohol solution | 20 parts |
| water | 60 parts |

The following components were dispersed in a small-sized sand mill at 90° C. and then at room temperature to obtain Liquid F having various average particle diameters as shown in Table 1.

[Liquid F]

| | |
|---|---|
| montan wax | 20 parts |
| 10% aqueous polyvinyl alcohol solution | 20 parts |
| water | 60 parts |

Using thus obtained Liquids D–F, coating liquid for forming a protecting layer was prepared.

Liquid D 20 parts

| | |
|---|---|
| Liquid D | 20 parts |
| 10% aqueous carboxy-modified polyvinyl alcohol solution | 40 parts |
| 25% aqueous solution of polyacrylamide-epichlorohydrin copolymer (solid content: 25%) | 8 parts |
| Liquid E | 4 parts |
| 20% aqueous silicone compound (as shown in Table 1 | 1 parts |
| Liquid F | 4 parts |
| water | 21 parts |

Liquid E

| | |
|---|---|
| 20% aqueous silicone compound (as shown in Table 1 | 1 part |
| Liquid F | 4 parts |
| water | 21 parts |

Preparation of Thermosensitive Recording Media

The above coating liquid for forming an intermediate layer was coated over the surface of a substrate (high quality paper) and dried to form an intermediate layer having a dried weight of 3 g/m$^2$. Then, the above coating liquid for forming a thermosensitive layer was applied over the intermediate layer and dried to form a thermosensitive layer having a leuco dye content of 0.5 g/m$^2$. Thereafter, a coating liquid for forming a protecting layer was applied over the surface of the thermosensitive layer and dried to form a protecting layer having a polyvinyl alcohol content of 1.6 g/m$^2$. This was calendared at a pressure of 30 kgf/cm$^2$ to obtain a thermosensitive recording media. In Examples 1–6, neither the silicone compound nor the organic pigment were used. In Examples 7–9, no organic pigment was used. In Example 9, no silicone compound was used but, in stead, zinc stearate was used. In Examples 10–15, no silicone compound was used.

Comparative Example 1

Example 1 was repeated in the same manner as described except that the montan wax of Liquid F used had an average particle size of 2.0 μm.

Comparative Example 2

Example 1 was repeated in the same manner as described except that Liquid F was prepared by dispersing the composition without melting the montan wax. Namely, the montan wax was only mechanically pulverized. The average particle diameter of the montan wax of Liquid F was 2.0 μm.

TABLE 1

| Example No. | Particle Size of Montan Wax (μm) | and Emulsifier | Silicone Compound | Organic Pigment and Particle Size | |
|---|---|---|---|---|---|
| 1 | 0.20 | PVA*1 | — | — | |
| 2 | 0.50 | PVA*1 | — | — | |
| 3 | 0.80 | PVA*1 | — | — | |
| 4 | 0.05 | PVA*1 | — | — | |
| 5 | 1.10 | PVA*1 | — | — | |
| 6 | 0.50 | Ani*2 | — | — | |
| 7 | 0.50 | PVA*1 | rubber*3 | — | |
| 8 | 0.50 | PVA*1 | resin*4 | — | |
| 9 | 0.50 | PVA*1 | Zn*5 | — | |
| 10 | 0.50 | PVA*1 | — | PMM*6 | 4 μm |
| 11 | 0.50 | PVA*1 | — | PMM*6 | 8 μm |
| 12 | 0.50 | PVA*1 | — | PMM*6 | 1 μm |
| 13 | 0.50 | PVA*1 | — | PMM*6 | 12 μm |
| 14 | 0.50 | PVA*1 | — | URF*7 | 8 μm |
| 15 | 0.50 | FVA*1 | — | Si *8 | 8 μm |
| 16 | 0.50 | PVA*1 | rubber*3 | PMM*6 | 8 μm |
| Comp. 1 | 2.0 | PVA*1 | — | — | |
| Comp. 2 | 2.0 | PVA*1 | — | — | |

*1: Polyvinyl alcohol
*2: Anionic surfactant
*3: room temperature curable silicone rubber
*4: room temperature curable silicone resin
*5: Zinc stearate
*7: Urea formaldehyde resin
*8: Silica The thus obtained thermosensitive recording media were stored at 40° C. for 15 hours under a relative humidity of 20% and then the resulting samples were tested for feeding and noise during the printing by the following methods.

Feeding

The sample is printed with a label printer (B-300 manufactured by TEC Inc.) at a printing speed of 3 inches/second such that a pattern of 20 cm length (in the feeding direction) will be printed if the feed of the sample is proper. If the sample is not fed smoothly due to unsatisfactory lubricity, then length of the printed line will be reduced. The length of the printed pattern are shown in Table 2.

Printing Noise

The noise is measured during the above feeding test. The background noise is 50 dB. The results are shown in Table 2.

Feeding After Being Humidified

The sample is allowed to stand at 32° C. and a relative humidity of 90% for 3 hours and then printed at a printing speed of 3 inches/second such that a pattern of 20 cm length will be printed if the feed of the sample is proper. The length of the printed pattern are shown in Table 2. Also observed a meandering of the printed pattern. The evaluation of the meandering is rated as follows:

A: no meandering
B: slight meandering
C: significant meandering

The results are summarized in Table 2.

TABLE 2

| Example No. | Length of Image (mm) | Printing Noise (dB) | Length of Image (mm)* | Meandering* |
|---|---|---|---|---|
| 1 | 198 | 68 | 185 | C |
| 2 | 200 | 68 | 184 | C |
| 3 | 198 | 69 | 184 | C |
| 4 | 196 | 69 | 184 | C |
| 5 | 196 | 68 | 186 | C |
| 6 | 194 | 68 | 186 | C |
| 7 | 200 | 56 | 192 | B |
| 8 | 200 | 60 | 193 | B |
| 9 | 200 | 64 | 192 | B |
| 10 | 200 | 70 | 200 | A |
| 11 | 200 | 69 | 200 | A |
| 12 | 200 | 67 | 194 | A |
| 13 | 200 | 68 | 198 | A |
| 14 | 200 | 68 | 196 | A |
| 15 | 200 | 68 | 192 | B |
| 16 | 200 | 55 | 200 | A |
| Comp. 1 | 185 | 78 | 172 | C |
| Comp. 2 | 192 | 73 | 180 | C |

*After being subjected to high humidity

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A thermosensitive recording medium comprising a support, a thermosensitive layer provided on said support, and a protecting layer provided on said thermosensitive layer and containing montan wax particles having an average particle diameter AD of not greater than 1.5 μm and such a particle size distribution that at least 99% of said montan wax particles have a particle diameter of not greater than (AD+0.5 μm).

2. A thermosensitive recording medium as claimed in claim 1, wherein said montan wax has an average particle diameter of 1 μm or less.

3. A thermosensitive recording medium as claimed in claim 1, wherein said protecting layer is obtained by drying a layer of an aqueous dispersion containing an aqueous emulsion of said montan wax particles.

4. A thermosensitive recording medium as claimed in claim 3, wherein said aqueous emulsion further contains polyvinyl alcohol as an emulsifier.

5. A thermosensitive recording medium as claimed in claim 1, wherein said protecting layer contains at least one member selected from the group consisting of silicone compound and an organic pigment.

6. A thermosensitive recording medium as claimed in claim 5, wherein said montan wax has an average particle diameter of 1 μm or less.

7. A thermosensitive recording medium as claimed in claim 5, wherein said silicone compound is silicone rubber.

8. A thermosensitive recording medium as claimed in claim 5, wherein said organic pigment has an average particle diameter of 2 to 10 μm.

9. A thermosensitive recording medium as claimed in claim 5, wherein said organic pigment is cross-linked methyl methacrylate.

* * * * *